(12) United States Patent
Pletschet

(10) Patent No.: US 7,958,619 B1
(45) Date of Patent: Jun. 14, 2011

(54) DISK CHUCK WITH RADIAL FORCE LIMITER

(75) Inventor: Timothy J. Pletschet, San Ramon, CA (US)

(73) Assignee: Xyratex Technology Limited (GB)

( * ) Notice: Subject to any disclaimer, the term of this patent is extended or adjusted under 35 U.S.C. 154(b) by 1119 days.

(21) Appl. No.: 11/686,569

(22) Filed: Mar. 15, 2007

(51) Int. Cl.
*B23B 31/20* (2006.01)
*B23B 31/40* (2006.01)

(52) U.S. Cl. ....... 29/559; 279/2.03; 279/2.09; 279/2.12; 279/4.04; 279/43.5; 279/46.4; 279/130

(58) Field of Classification Search ............. 29/559; 279/2.03, 2.09, 2.12, 4.04, 43.4, 43.5, 46.4, 279/46.5, 130; *B23B 31/20, 31/40*
See application file for complete search history.

(56) References Cited

U.S. PATENT DOCUMENTS

| | | | |
|---|---|---|---|
| 2,398,278 A * | 4/1946 | Bailey | 82/152 |
| 2,507,686 A * | 5/1950 | Altmayer | 279/2.24 |
| 3,360,276 A * | 12/1967 | Peffer | 279/2.03 |
| 3,495,844 A * | 2/1970 | Dee | 279/35 |
| 3,583,714 A * | 6/1971 | Weltzer et al. | 279/51 |
| 3,587,371 A * | 6/1971 | Sherwood | 82/169 |
| 3,734,513 A * | 5/1973 | Kanebako et al. | 279/48 |
| 3,768,815 A * | 10/1973 | Mathurin | 279/2.03 |
| 4,755,981 A * | 7/1988 | Ekhoff | 720/707 |
| 4,958,839 A | 9/1990 | Guzik et al. | |
| 5,048,005 A | 9/1991 | Ekhoff | |
| 5,056,082 A | 10/1991 | Ekhoff | |
| 5,275,424 A * | 1/1994 | Watanabe | 279/2.03 |
| 5,560,624 A * | 10/1996 | Williams et al. | 279/2.03 |
| 5,644,564 A | 7/1997 | Peters | |
| 5,785,324 A * | 7/1998 | Williams et al. | 279/2.03 |
| 6,954,330 B2 | 10/2005 | Yeom | |

* cited by examiner

*Primary Examiner* — Eric A Gates
(74) *Attorney, Agent, or Firm* — Martine Penilla & Gencarella, LLP

(57) ABSTRACT

A chuck holds a disk by the inside diameter with a plurality of contact surfaces at the end of fingers. Axial motion of an actuator is translated into outward radial movement of the fingers to place the contact surfaces in contact with the inside diameter of the disk. The force that is applied to the disk is limited to reduce or eliminate warping or curvature of the disk, e.g., a sleeve that surrounds the fingers can be used as a hard stop to physically limit the range of outward radial movement of the fingers.

28 Claims, 4 Drawing Sheets

DISK CHUCK WITH RADIAL FORCE LIMITER

FIELD OF THE INVENTION

The present invention generally relates to disk chucks that center and clamp disks, such as rigid and flexible magnetic media, optical data storage media and the like, and in particular to disk chucks for releasably securing a disk for high speed rotation.

BACKGROUND

During the manufacture of magnetic or optical recording media, such as floppy disks, hard disks, CD ROM disks, magneto-optical disks, and the like, many process steps require that the disk be releasably mounted to a rotatable arbor. Such process steps may include application of surface coatings, as well as cleaning, polishing, burnishing, and testing.

There are known in the prior art various forms of rotating disk chucks for releasably mounting a disk. Data disks must conform to extremely close tolerances for planarity, surface finish, and coating integrity, which requires that the chuck securing a disk during processing must grip the disk with a high degree of concentricity and planarity, and cannot impart any curvature or warping to the disk. Moreover, the chuck must grip the disk only at portions that will not be used for data recording. An improved disk chuck is desired.

SUMMARY

In accordance with an embodiment of the present invention, a chuck holds a disk by the inside diameter with a plurality of contact surfaces at the end of fingers. Axial motion of an actuator is translated into outward radial movement of the fingers to place the contact surfaces in contact with the inside diameter of the disk. The force that is applied to the disk is limited to reduce or eliminate warping or curvature of the disk. In one embodiment, a sleeve that surrounds the fingers of the collet can be used as a hard stop to physically limit the range of outward radial movement of the fingers.

DETAILED DESCRIPTION

Figure 1:
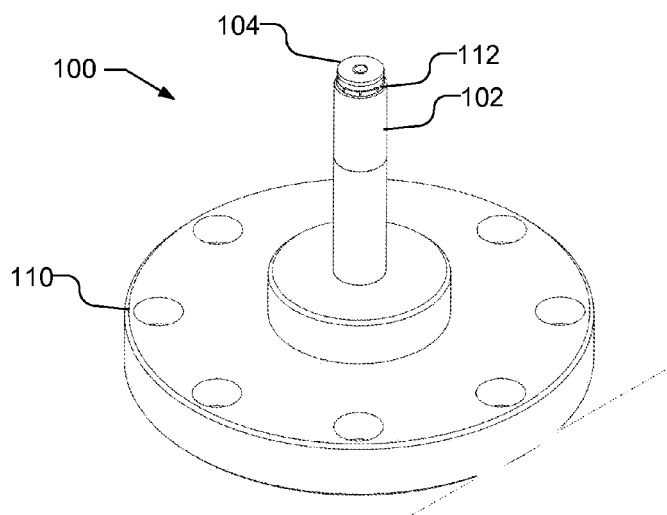
FIG. 1 is a perspective view of a chuck, in accordance with one embodiment of the present invention.
Figure 2:
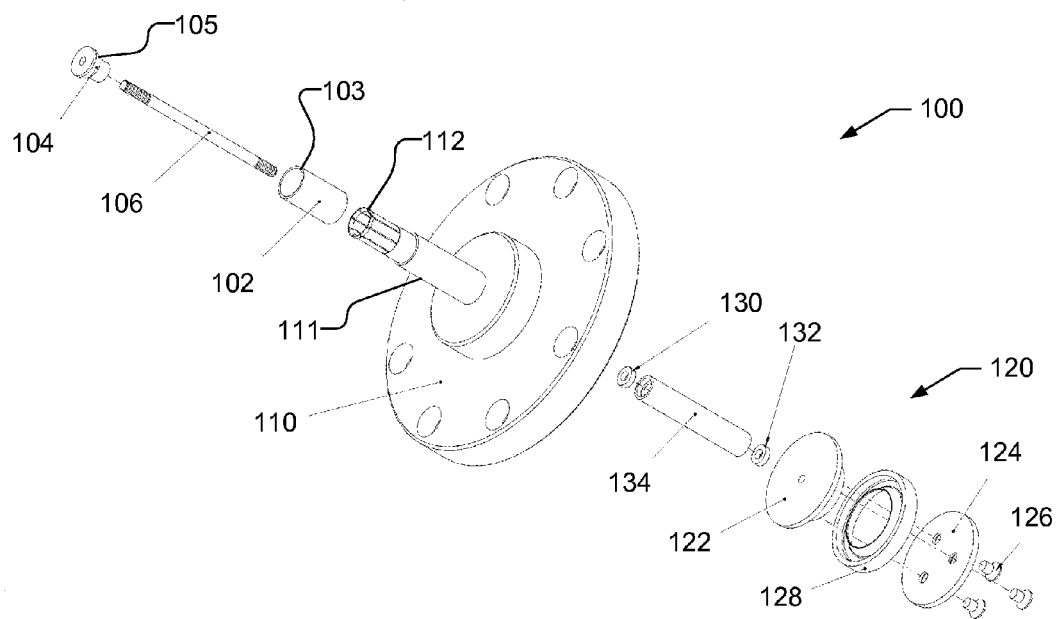
FIG. 2 is an exploded perspective view of the chuck of FIG. 1.
Figure 3:
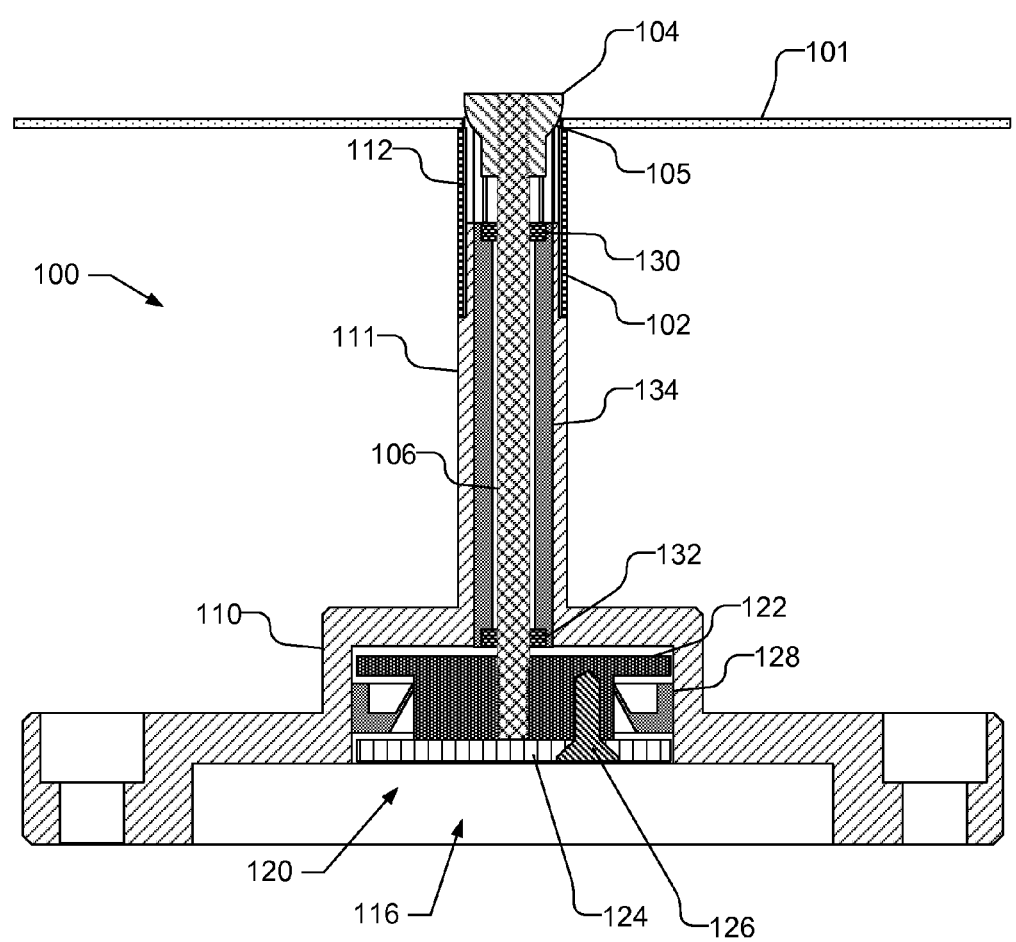
FIG. 3 is a cross-sectional view of the chuck of FIG. 1.

FIGS. 1 and 2 are a perspective view and an exploded perspective view and FIG. 3 is a cross-sectional view of a chuck 100 for a disk 101 in accordance with one embodiment of the present invention. The chuck 100 includes a base 110 with an axially extending shaft 111. A collet 112 at the end of the shaft 111 holds a disk 101 from the inside diameter of an aperture in the disk 101. A sleeve 102 at least partially surrounds the collet 112 leaving the end of the collet 112 exposed to contact the inside diameter of the disk. The sleeve 102 limits the outward radial movement of the collet 112 by serving as a hard stop. Additionally, the end 103 of the sleeve 102 serves as an annular shoulder (sometimes referred to as a Z-surface) upon which the disk 101 is seated as a reference surface.

The chuck 100 includes an expander element, such as expander cap 104, that is used to radially expand the collet 112 to contact and hold a disk. As illustrated in FIG. 3, the expander cap 104 fits at least partially within a central opening of the collet 112 and includes a rounded fillet 105 that contacts beveled surfaces on the inside of fingers of the collet 112 to expand the collet 112. If desired, other types of expander elements may be used. For example, the expander element may be completely contained within the central opening of the collet 112 and is, thus, not a cap.

The expander element, e.g., expander cap 104, is coupled to an actuator 120 via a piston rod 106, which may be, e.g., threadedly coupled to both the expander cap 104 and the actuator 120. The actuator 120 pulls the piston rod 106 axially towards the base 110, which pulls the expander cap 104 into the collet 112. The rounded fillet 105 on the expander cap 104 and beveled surfaces on the inside surfaces of the collet 112 translate the axial motion of the expander cap 104 into radial expansion of the collet 112. In this manner, the collet 112 can be expanded to contact the inside diameter of a disk. The sleeve 102, however, limits the radial expansion of the collet 112, thereby limiting the force that is applied on the collet 112 to the disk 101. It should be understood that if desired, the expander cap 104 may have a beveled surface and the collet have the rounded fillet. Alternatively, both the collet and the expander cap may have beveled surfaces, but this will increase friction when attempting to expand the collet 112.

The actuator 120 is mounted in a cavity 116 within the base 110. The actuator 120 may be a vacuum activated piston, as illustrated in FIGS. 2 and 3, but any desired type of actuator may be used with chuck 100, for example spring closed and air release. The vacuum activated actuator 120 includes a piston 122 and a piston cap 124 that is mounted to the piston 122, e.g., by screws 126. A seal 128 is held in between the piston 122, the piston cap 124, and an internal surface of the base 110. The piston rod 106 is threadedly coupled to the piston 122. The piston rod 106 is inserted through and guided by bearings 130 and 132, which may be, e.g., jeweled bearings. The bearings 130, 132 are held by a bearing mount 134 that is press fit or bonded inside the axially extending shaft 111, e.g., using an epoxy, such as that produced by Hernon or Loctite.

The sleeve 102, expander cap 104 and the collet 112 (and, thus, the base 110 and shaft 111, which are integrally formed) are manufactured from non-magnetic materials, such as stainless steel, aluminum and possible plastic may be used, particularly for the expander cap. Additionally, the materials used for the collet 112 and the expander cap 104 should be dissimilar.

Figure 4:
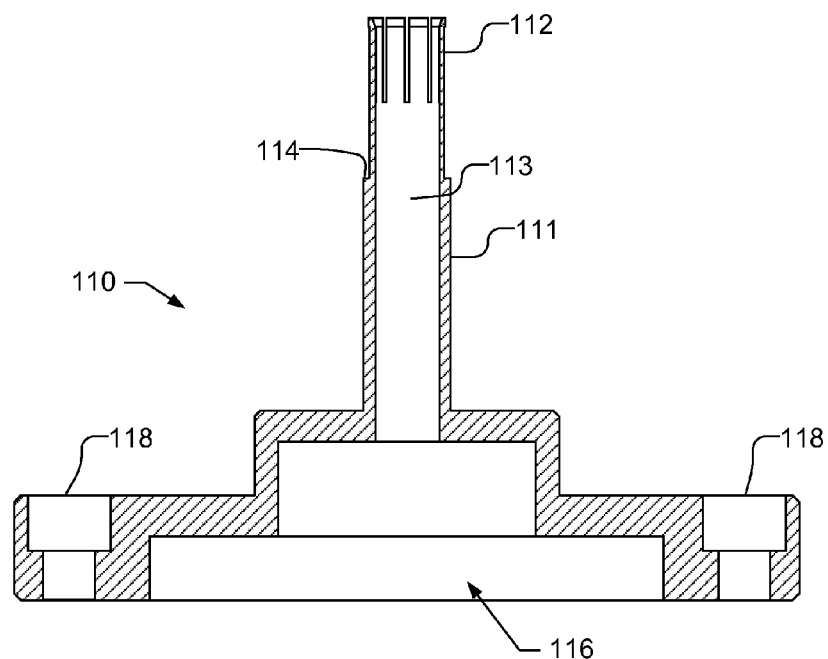
FIG. 4 illustrates a cross sectional view of the base, axially extending shaft and collet of the chuck.

FIG. 4 illustrates a cross sectional view of the base 110 and shaft 111 with the collet 112. The base 110 has a generally cylindrical body that includes hollow central cavity 116 in which the actuator 120 (shown in FIGS. 2 and 3) is mounted. The axially extending shaft 111 includes a central bore 113 that is in communication with the central cavity 116 of the base 110. The piston rod 106, along with the bearings 130 and 132 and bearing holder 134, is positioned within the central bore 113 and connects the actuator 120 to the expander cap 104 (shown in FIGS. 1 and 2) when installed. As illustrated in FIG. 4, the collet 112 is integrally formed at the end of the shaft 111. The shaft 111 also includes an annular shelf 114 that the serves as a positioning stop for the sleeve 102 (shown in FIGS. 1, 2, and 3). Also illustrated in FIG. 4 are through holes and counter bores 118 in the base 110 for bolts or other connectors to mount the base 110 to a spindle (not shown) to rotate chuck 100 during operation. The bottom of the base 110 is lapped to form a good seal with the spindle when attached. The vacuum is applied to the cavity 116 and the actuator 120 by way of a through bore in the spindle to which the chuck 100 is attached during operation. The spindle may be any conventional spindle or an air bearing spindle, used in the industry, such as the types manufactured by Dover Instrument Corporation of Westboro, Mass. or ABT Inc., a division of KLA Tencor, of Swanzey, N.H.

Figures 5A, 5B:
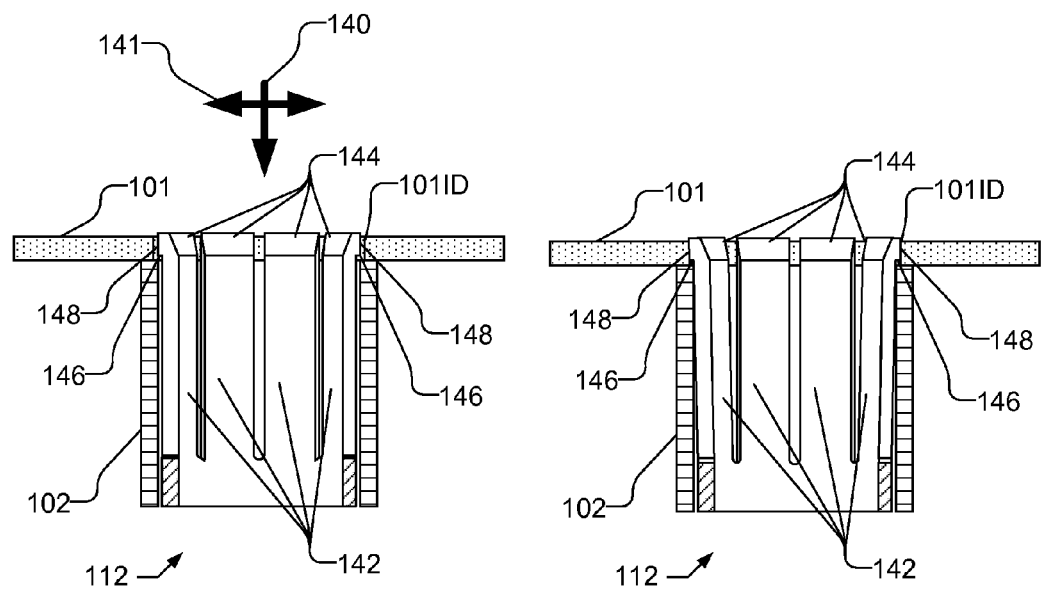
FIGS. 5A and 5B illustrate cross sectional views of the collet with a disk that is, respectively, unsecured and secured to the chuck.

FIGS. 5A and 5B illustrate cross sectional views of the collet 112 at the end of the shaft 111 with a portion of a disk 101 and the sleeve 102. As can be seen in FIGS. 5A and 5B, the collet 112 includes a number of fingers 142 with annularly oriented outwardly extending projections 146. The radially facing contact surfaces 148 of the projections 146 make contact with the inside diameter 101ID of the disk 101 when the chuck 100 is closed on the disk 101. In one embodiment, each finger 142 includes a beveled surface 144 on the central opening to assist in translating axial movement of the expander cap 104, illustrated by arrow 140 in FIG. 5A, to radial movement of the fingers 142, illustrated by arrow 141 in FIG. 5A.

As shown in FIG. 5A, when the chuck 100 is open, i.e., the disk 101 is not secured by the chuck 100, the disk 101 is supported by the end 103 of the sleeve 102, which acts as a reference surface for the disk 101. When the expander cap 104 is pulled axially toward the base 110 by the actuator 120, the rounded fillet 105 of the expander cap 104 make contact with the beveled surfaces 144 of the fingers 142, pushing the fingers 142 outward. FIG. 5B, illustrates the collet 112 when the chuck 100 is closed, i.e., the disk 101 secured by the chuck 100. As can be seen, the contact surfaces 148 of the fingers 142 contact the inside diameter 101ID of the disk 101 to secure the disk 101. To release the disk 101, the actuator 120 moves the expander cap 104 in the opposite direction and the fingers 142 of the collet 112, which are biased radially inward, disengage with the inside diameter 101D of the disk 101. The sleeve 102 limits the outward radial travel of the fingers 142, as illustrated in FIG. 5B, thereby limiting the stress that the fingers 142 may impart on the disk 101. Thus, for example, when chuck 100 is operated at very high angular speed, the outward force of the fingers 142 is limited by the sleeve 102 and accordingly, the centrifugal force on the fingers 142 will impart very little or no additional stress to the disk 101.

Moreover, because the fingers 142 impart an outward force on the inside diameter 101ID of the disk 101, as opposed to a downward clamping force, the fingers 142 generate little or no curvature or warping of the disk 101. It should be noted that it may be desirable for the contact surface 148 of the projections 146 to be slightly beveled downward, e.g., approximately 1° or less, to impart a small downward force on the disk 101 to help maintain the position of the disk 101 against the end of the sleeve 102. Nevertheless, even with a beveled contact surface 148, most of the force provided by the fingers 142 on the disk 101 is outward and, thus, there is little or no curvature or warping of the disk 101. Further, collet 112 provides a large approximately continuous area of contact on the inside diameter of the disk 101, which further assists in limiting the curvature or warping of the disk 101. During manufacturing, it may be desirable to machine and/or polish the contact surfaces 148 of the fingers with the chuck 100 in a closed position, i.e., with the fingers 142 pushed outward, so that the position of the contact surfaces 148 are as accurate as possible when the chuck 100 is holding a disk.

In one embodiment, the fingers 142 are manufactured to provide a spring force to bias the chuck 100 in an open position. The spring force of the fingers 142 should be less than the force applied by the actuator 120, which is, e.g., approximately 3 to 3.5 pounds, but sufficient to open the chuck to release a disk when the vacuum is released. The fingers 142 may be manufactured with an appropriate spring force by one of ordinary skill in the art in light of the present disclosure and taking into considerations such as the number, thickness and material of fingers as well as the vacuum force applied by the spindle and friction coefficient between the collet 112 and the expander cap 104. In another embodiment, a spring inside the central bore 113, e.g., between the expander cap 104 and the bearing mount 134, may be used to produce the desired open bias force. Alternatively, the spindle may apply a vacuum to close the chuck 100 and air pressure to open the chuck 100. In yet another embodiment, the chuck 100 may be biased closed, e.g., with a spring inside the central bore 113, e.g., between the bearing mount 134 and/or the base 110 and the actuator 120, may be used to produce the desired closed bias force. The spindle would apply air pressure to the actuator 120 to overcome the spring bias to open the chuck 100.

Figure 6:
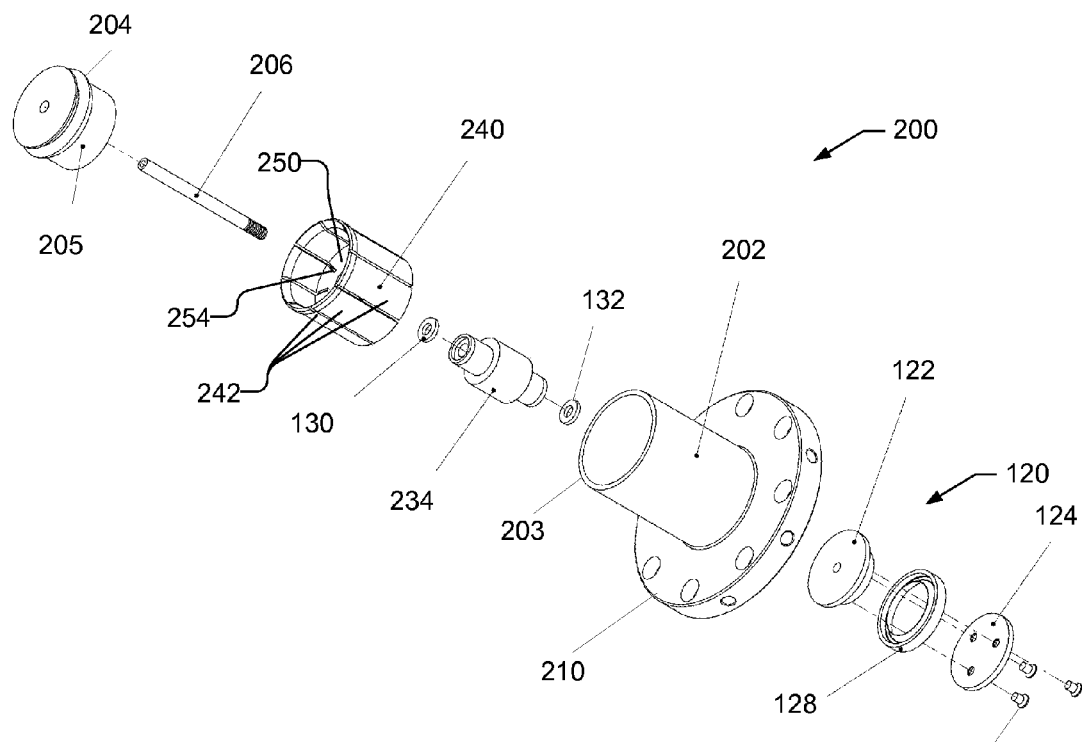
FIG. 6 is an exploded perspective view of a chuck, in accordance with another embodiment of the present invention.
Figure 7:
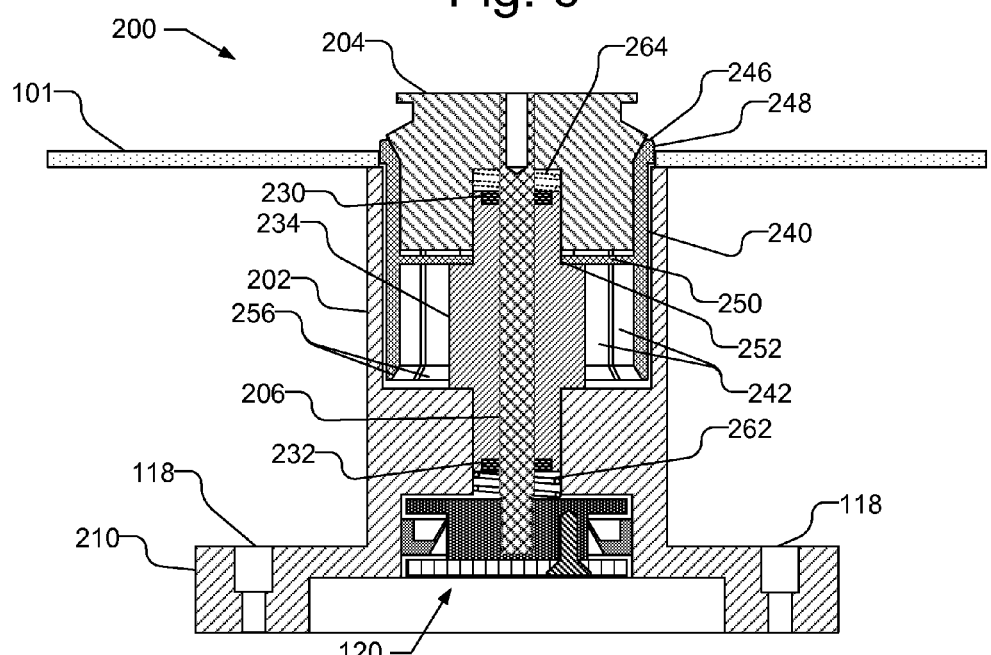
FIG. 7 is a cross-sectional view of the chuck of FIG. 6.

FIGS. 6 and 7 illustrate an exploded perspective view and a cross-sectional view of a chuck 200 for a disk 101, in accordance with another embodiment of the present invention, like designated elements being the same.

Chuck 200 includes cantilevered collet 240 that is formed separately from and is coupled to the base 210. A sleeve 202 is mounted to the base 210 and in one embodiment is integrally formed with the base 210 as an axially extending shaft. As with sleeve 102 in FIG. 2, the sleeve 202 includes an end 203 that serves as annular reference surface for the disk 101. The collet 240 is positioned inside the sleeve 202 and is held in position by the bearing mount 234, which also holds the bearings 230 and 232, through which the piston rod 206 extends from the actuator 120 to the expander cap 204. The bearing mount 234 may be press fit or bonded to a central bore in the base 210.

As with the collet 112 in FIG. 2, the collet 240 includes a plurality of fingers 242 that are annularly oriented with outwardly extending projection 246 having radially facing contact surfaces 248. The collet 240 further includes a radial ring 250 with a center aperture 252, through which a portion of the bearing mount 234 passes. The radial ring 250 is positioned at approximately the center of mass of each finger 242. The fingers 242 are, thus, cantilevered with the radial ring 250 serving as the fulcra. Accordingly, it is desirable for the radial ring 250 to be as close as possible to the center of mass of the fingers 242. In one embodiment, the center of mass is approximately half of the axially extending length of each finger 242. As illustrated in FIG. 7, the distal end of the fingers 242 with respect to the expander cap 204 may be trimmed, e.g., to form beveled surface 256, to place the center of mass of the fingers 242 at approximately the point of contact with the radial ring 250. As can be seen in FIG. 6, the radial ring 250 may include a plurality of radial slits 254 that coincide with the fingers 242. The expander cap 204, or other type of expander element, includes a rounded fillet 205 that contacts the internal beveled surfaces 244 of the fingers 242 to translate axial movement of the expander cap 204 into radial movement of the fingers 242.

In operation, the actuator 120 pulls the piston rod 206 axially towards the base 210, which pulls the expander cap 204 into the collet 240 thereby producing radial movement of the fingers 242. The amount of outward movement of the fingers 242 and, thus, the static force applied to a disk 101, is controlled by the actuator 120 and the vacuum or air pressure supplied by the spindle (not shown) to which the chuck 200 is attached. The sleeve 202 may serve as a hard stop to limit the radial movement of the fingers 242 as described in reference to chuck 100.

The chuck 200 may be bias closed using spring 262 and opened using air pressure supplied from the spindle to the actuator 120. Alternatively, the chuck 200 may be biased open using spring 264, illustrated with dotted lines, and closed using a vacuum supplied from the spindle to the actuator 120. In yet another embodiment, the spring force supplied by the fingers 242 may bias the chuck 200 open, as discussed above.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A chuck for holding a disk with an aperture with an inside diameter, the chuck comprising:
   a base;
   a collet coupled to the base, the collet comprising a plurality of fingers annularly arranged around an axis to define a central opening, the plurality of fingers having radially outward facing contact surfaces, the contact surfaces contact the inside diameter of a disk when held by the chuck;
   an expander element fitting at least partially within the central opening of the collet;
   an actuator coupled to the base and the expander element, the actuator moving the expander element with respect to the collet to produce radial movement of the contact surfaces on the plurality of fingers; and
   means for limiting the outward radial force applied by the plurality of fingers on the inside diameter of a disk held by the chuck.

2. The chuck of claim 1, wherein the means for limiting the outward radial force comprises a sleeve coupled to the base and surrounding at least a portion of the plurality of fingers, the contact surfaces of the plurality of fingers being uncovered by the sleeve, the sleeve limiting outward radial movement of the plurality of fingers.

3. The chuck claim 2, wherein the sleeve has a top surface annular surface that contacts a bottom surface of a disk when the disk is held by the chuck.

4. The chuck of claim 2, further comprising an axial shaft coupled to the base, the sleeve being positioned over the axial shaft.

5. The chuck of claim 4, wherein the collet is integrally formed from the axial shaft, the collet being positioned at the end of the axial shaft.

6. The chuck of claim 2, wherein the sleeve is an axial shaft integrally formed from the base.

7. The chuck of claim 6, wherein the collet is mounted to the base inside the sleeve.

8. The chuck of claim 7, further comprising:
   a rod coupled to the actuator and the expander element and that conveys motion from the actuator to the expander element;
   a bearing mount coupled to the base, the collet being coupled to the bearing mount that positions the collet with respect to the base; and
   at least two bearings coupled to the bearing mount, the rod extending through the bearings and the bearing mount.

9. The chuck of claim 1, wherein each finger in the plurality of fingers of the collet is cantilevered.

10. The chuck of claim 9, wherein the collet comprises a radial ring coupled to each finger at approximately the center of mass of each finger, the radial ring being the fulcra for each cantilevered finger.

11. The chuck of claim 10, wherein each cantilevered finger has a length, the center of mass of each cantilevered finger being approximately half of the length of each finger.

12. The chuck of claim 1, further comprising a rod coupled to the actuator and the expander element that conveys axial motion from the actuator to the expander element.

13. The chuck of claim 12, further comprising a bearing mount coupled to the base and extending in an axial direction, and at least two bearings coupled to the bearing mount, the rod extending through the bearings and the bearing mount.

14. The chuck of claim 1, further comprising a beveled surface where the expander element contacts the collet, the beveled surface translates axial movement of the expander element to the radial movement of the contact surfaces on the plurality of fingers.

15. The chuck of claim 14, wherein the expander element is a cap that extends at least partially beyond the collet in the axial direction.

16. The chuck of claim 1, wherein the base comprises an internal cavity, the actuator being positioned inside the internal cavity of the base.

17. The chuck of claim 1, wherein the plurality of fingers provide a spring force to bias the chuck open.

18. A method of securing a disk with an aperture with an inside diameter to a chuck for rotation of the disk about an axis, the method comprising:
   translating axial movement of an actuator to axial movement of an expander element;
   translating axial movement of the expander element to outward radial movement of a plurality of radially outward facing contact surfaces to contact the inside diameter of the disk; and
   limiting the outward radial force of the contact surfaces on the inside diameter of the disk that is produced by centrifugal force.

19. The method of claim 18, wherein limiting the outward radial force comprises physically limiting the outward radial movement of the contact surfaces with a hard stop.

20. A chuck for holding a disk with an aperture with an inside diameter, the chuck comprising:
   a base;
   a z-surface coupled to the base, the z-surface contacting a bottom surface of a disk when the disk is being mounted to the chuck;
   a collet mounted to the base, the collet comprising a plurality of cantilevered fingers annularly arranged around an axis to define a central opening and a radial ring coupled to each cantilevered finger at approximately the center of mass of each cantilevered finger, the radial ring being the fulcra for each cantilevered finger, the plurality of fingers having radially outward facing contact surfaces, the contact surfaces contact the inside diameter of a disk when held by the chuck;
   an expander element fitting at least partially within the central opening of the collet; and an actuator coupled to the base and the expander element, the actuator moving the expander element with respect to the collet to produce radial movement of the contact surfaces on the plurality of fingers.

21. The chuck of claim 20, further comprising a beveled surface where the expander element contacts the collet, the beveled surface translates axial movement of the expander element to the radial movement of the contact surfaces on the plurality of fingers.

22. The chuck of claim 20, further comprising a sleeve integrally formed from the base as an axial shaft, the sleeve having a top annular surface that is the z-surface, the collet mounted to the base inside of the sleeve.

23. The chuck of claim 20, further comprising:
a rod coupled to the actuator and the expander element and that conveys motion from the actuator to the expander element;
a bearing mount coupled to the base, the collet being coupled to the bearing mount that positions the collet with respect to the base; and
at least two bearings coupled to the bearing mount, the rod extending through the bearings and the bearing mount.

24. The chuck of claim 20, wherein each cantilevered finger has a length, the center of mass of each cantilevered finger being approximately half of the length of each finger.

25. A chuck for holding a disk with an aperture with an inside diameter, the chuck comprising:
a base;
a collet coupled to the base, the collet comprising a plurality of cantilevered fingers annularly arranged around an axis to define a central opening and a radial ring coupled to each cantilevered finger at approximately the center of mass of each cantilevered finger, the plurality of cantilevered fingers having radially outward facing contact surfaces, the contact surfaces contact the inside diameter of a disk when held by the chuck;
an expander element fitting at least partially within the central opening of the collet; and
an actuator coupled to the base and the expander element, the actuator moving the expander element with respect to the collet to produce radial movement of the contact surfaces on the plurality of cantilevered fingers.

26. The chuck of claim 25, wherein each cantilevered finger has a length, the center of mass of each cantilevered finger being approximately half of the length of each cantilevered finger.

27. The chuck of claim 25, further comprising a sleeve coupled to the base and surrounding the plurality of cantilevered fingers, the contact surfaces of the plurality of cantilevered fingers being uncovered by the sleeve, the sleeve limiting outward radial movement of the plurality of cantilevered fingers.

28. The chuck claim 27, wherein the sleeve has a top surface annular surface that contacts a bottom surface of a disk when the disk is held by the chuck.

\* \* \* \* \*